United States Patent [19]

Swindall

[11] Patent Number: 5,288,095
[45] Date of Patent: Feb. 22, 1994

[54] TRAILER HITCH
[76] Inventor: Jackie J. Swindall, 9441 W. University, Odessa, Tex. 79764
[21] Appl. No.: 13,081
[22] Filed: Feb. 3, 1993
[51] Int. Cl.⁵ .............................................. B62D 53/00
[52] U.S. Cl. ................................. 280/479.2; 280/479.3
[58] Field of Search .................. 280/477, 478.1, 479.2, 280/479.3, 491.1, 491.2, 491.3, 504, 506, 432

[56]  References Cited
U.S. PATENT DOCUMENTS

| | | | |
|---|---|---|---|
| 3,126,210 | 3/1964 | Hill | 280/479.2 |
| 3,622,182 | 11/1971 | Grosse-Rhode | 280/479.3 |
| 3,860,267 | 1/1975 | Lyons | 280/479.3 |
| 4,951,957 | 8/1990 | Gullickson | 280/479.3 X |

Primary Examiner—Margaret A. Focarino
Assistant Examiner—Victor E. Johnson
Attorney, Agent, or Firm—Milburn & Peterson

[57] ABSTRACT

This invention relates to trailer hitches generally and more specifically to a hitch that may be swiveled and extended as necessary to couple a trailer thereto and readily align and lock the hitch in transportation mode. The hitch has a base plate with a partial semicircular perimeter having a trunnion formed at its center of radius, a tubular housing secured at the trunnion atop the base plate to permit arcuate movement relative to the base plate, and tubular housing having a safety member thereunder which protrudes beneath the semicircular perimeter to limit relative vertical movement between the tubular housing and the base plate, a slide bar captured within said tubular housing with a towing ball projecting beyond said housing for limited linear movement therein, and a spring biased locking pin for releasable securing the trailer hitch with the slide bar retracted and the tubular housing centered along the perimeter.

4 Claims, 3 Drawing Sheets

TRAILER HITCH

BACKGROUND OF THE INVENTION

1. Field of the Invention

This invention relates to improvements in the attachment of towed vehicles to towing vehicles, and more particularly, to an improved trailer hitch which allows misalignment of a towing vehicle with respect to a vehicle to be towed as the vehicles are being coupled together.

Trailer hitches typically have a hitch ball mounted on a hitch bar rigidly secured to a towing vehicle. This ball is adapted to be coupled to the socket on the tongue of a vehicle or trailer to be towed. Generally, with trailer hitch assemblies of this type, the towing vehicle must be moved in reverse with the ball properly aligned with the trailer socket to make the necessary connection.

2. Description of the Prior Art

Attempts have been made to solve a misalignment problem when the socket of a vehicle to be towed is not properly aligned with the ball of the towing vehicle when the latter is moving in reverse. U.S. Pat. Nos. 3,860,267 and 4,350,362 disclose trailer hitches having singable bars which pivot in a horizontal plane to accommodate such misalignment between a towing vehicle and a trailer. However, both patents show a one-piece bar movable out of a bar-like housing, but such construction does not allow the user to pivot the bar until the bar is completely out of the housing. This is the main drawback of the trailer hitch of U.S. Pat. No. 3,860,267.

U.S. Pat. No. 4,350,362 shows a slightly different trailer hitch in that it does not have a long, slender housing for supporting the main hitch bar. The hitch bar of U. S. Pat. No. 4,350,362 has the same drawback as U.S. Pat. No. 3,860,267 in that it has a hitch bar which cannot pivot about a vertical axis until the full length of the hitch bar is pulled outwardly from its retracted position.

U.S. Pat. No. 4,951,957 shows a typical wide-range hitch assembly which mounts on the towing vehicle generally underneath and protrudes as little as possible beyond the bumper of the vehicle. The advantage of placing the hitch under the vehicle to avoid protrusion of the ball far beyond the rear bumper is offset by the reduced lateral maneuverability or movement of the ball and extendibility beyond the bumper to accommodate a wide-range misalignment between the towing vehicle and the trailer.

SUMMARY OF THE INVENTION

The present invention is directed to a trailer hitch or swivel hitch of improved construction which is simple and rugged and which provides greater flexibility in maneuvering a towing vehicle into a position to be hitched to a trailer.

The present invention is readily attached to the existing pick-up bumpers which are accommodated for mounting trailer balls directly to the bumper and generally provide at least three holes for various size trailer balls. Applicant utilizes this bumper configuration to secure the base plate and housing which retains a telescoping draw or slide bar, of his swivel hitch to the vehicle. The housing and base plate are secured by a shoulder bolt which acts as a trunnion for the lateral movement of the housing. The base plate is additionally secured in the other remaining holes of the bumper to provide substantial support for the hitch assembly. The hitch includes a safety bar which limits vertical movement between the base plate and housing. The base plate has a semicircular periphery to accommodate the safety bar and housing for travel in an arcuate path. A releasable locking pin holds the housing and slide bar in a locked or transporting position and is readily released by a pull-ring to withdraw and allow the slide bar and the housing to move relatively to the locking pin. Once the trailer has been hitched to the hitch bar, then the vehicle is pulled forward and the housing and slide bar move into alignment such that the locking pin protrudes through a bore in the bottom of the housing and when the vehicle is slowed or stopped, the draw or slide bar closes in the housing until the bore therethrough encounters the locking pin which immediately seats into the slide bar, thus locking the trailer hitch in towing position.

The swivel hitch of the present invention provides all the features desirable in a trailer hitch and can be readily secured to a bumper by bolts without the necessity of welding or some other means of attaching a trailer hitch to a bumper or the under-frame of the towing vehicle as shown in the prior art.

Thus, the present invention provides an improved swing hitch for trailers which is versatile and comprises relatively few parts and readily attaches to the bumpers of most presently manufactured pick-up trucks and the like.

The object of the present invention is to provide an improved trailer hitch which has a high degree of lateral movement about a trunnion which is centered on the bumper of the towing vehicle and has an extendable and retractable draw bar f or mounting the trailer ball to accommodate securing a trailer to the hitch.

Another object of this invention is to provide a simple trailer hitch which by releasing a locking pin can be laterally and longitudinally maneuvered to accommodate ease of attachment of a trailer to the hitch and automatically realigns and locks in a traveling position.

Other objects of this invention will become apparent from the following description, as described in conjunction with the accompanying drawings.

IN THE DRAWINGS

FIG. 1 is an exploded perspective view of the swivel hitch of the present invention secured to a vehicle bumper; and FIG. 2 is a partial cross-sectional view of the assembled hitch illustrating the extendibility of the slide bar in phantom; and FIG. 3 illustrates the hitch mounted to a pick-up truck bumper with three trailer hitch mounting bores which are utilized to secure Applicant's hitch and illustrates in phantom the lateral and longitudinal movement of the hitch relative to the central trunnion.

DETAILED DESCRIPTION OF THE PREFERRED EMBODIMENT

Figure 1:
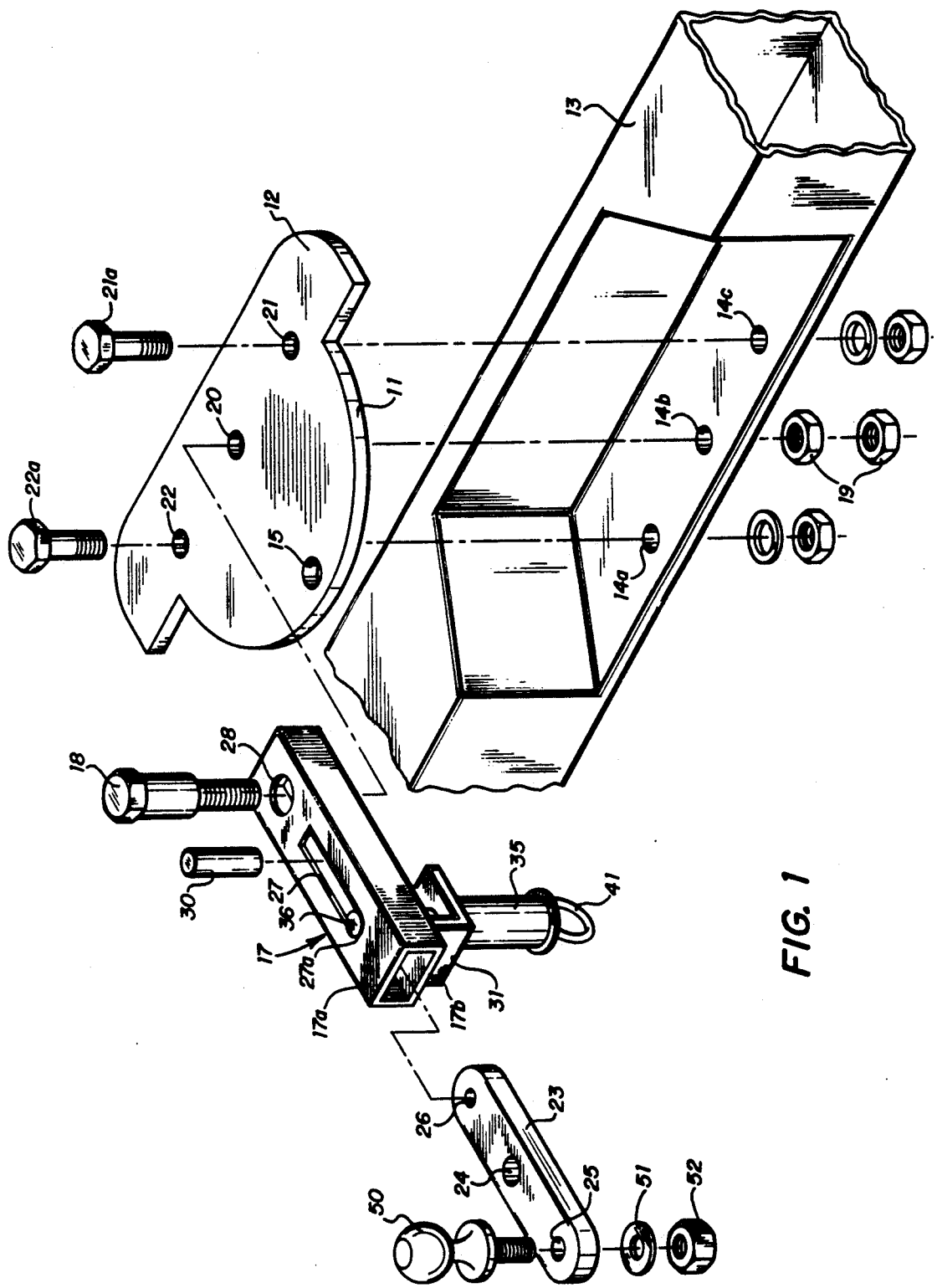
Figure 2:
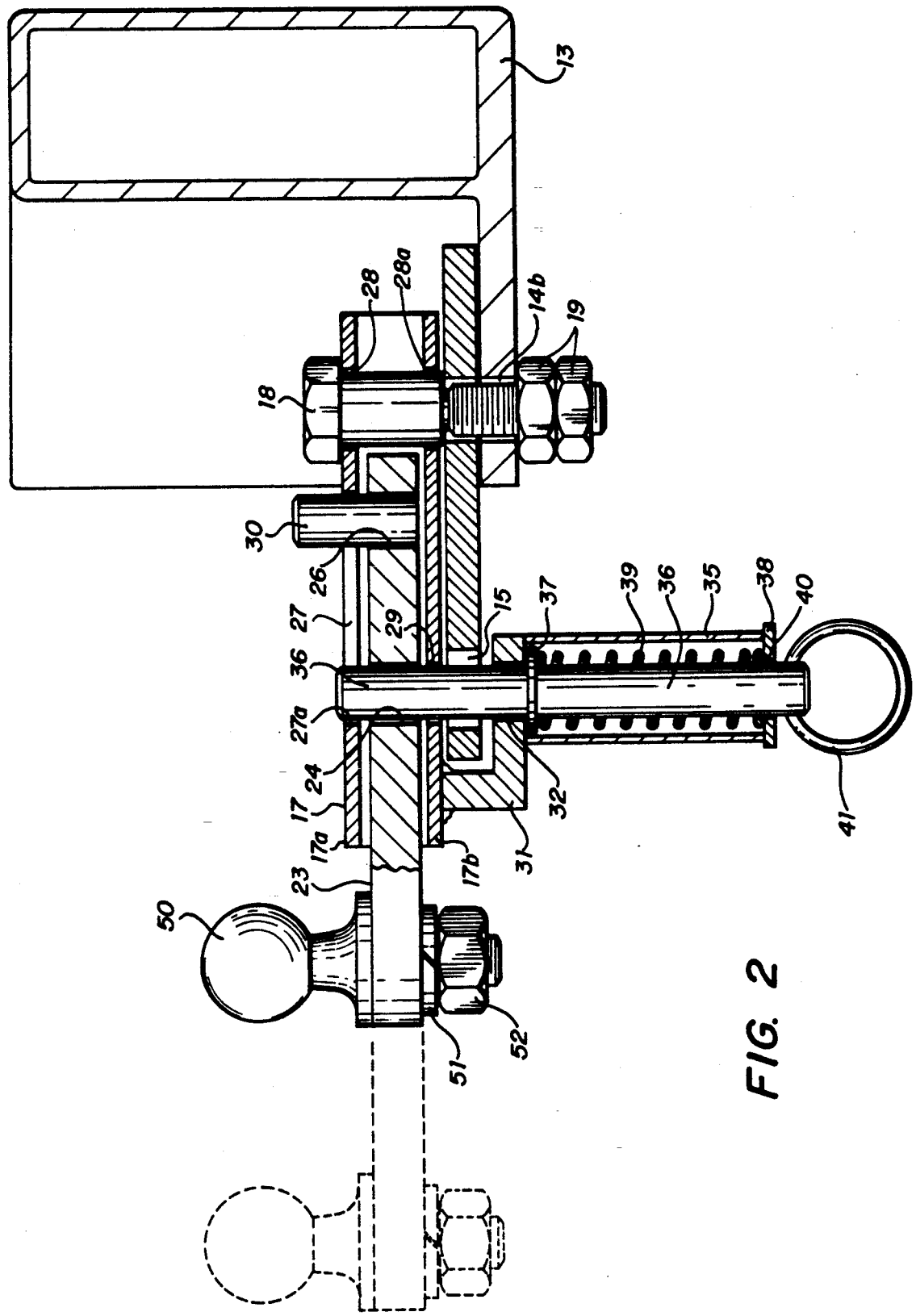
Figure 3:
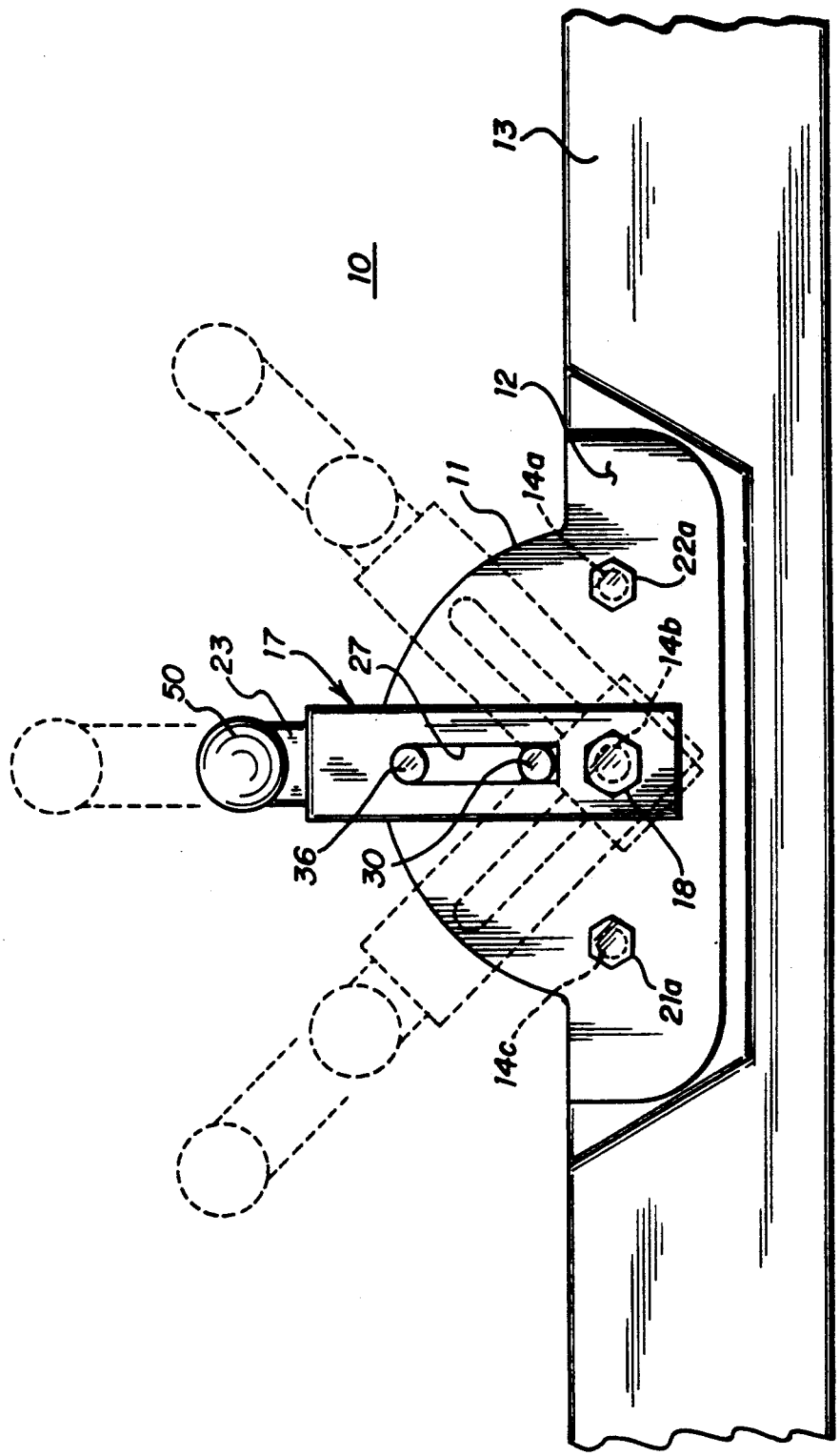

Ref erring to FIGS. 1, 2 and 3 of the drawings, the swivel hitch of the present invention is generally referred to as 10 and includes a base plate 12 which has a central bore 20 and a pair of bores 21 and 22 on each side of central bore 20 and a semicircular perimeter 11. Base plate 12 also has a bore 15 which is on a radius bisecting the semicircular perimeter 11. The base plate 12 is secured to a truck bumper 13 in the three factoryproduced bumper bores 14a, 14b and 14c for mounting one or more trailer balls therein. Of course a bumper that does not have such bores could be so modified. A bore hole 29 is provided in bottom wall 17b of housing 17. Housing 17 has a longitudinal slot 27 and coaxially aligned bores 28 and 28a through the top wall 17a and bottom wall 17b of the housing 17. Slot 27 has a semicircular end 27a which is coaxially aligned with bore hole 29 in bottom wall 17b.

The base plate 12 and housing 17 are secured to the bumper 13 by shoulder bolt 18 passing through bores 28 and 28a in housing 17, central bore 20 in base plate 12, and bumper bore 14b and secured by lock nuts 19 which forms a trunnion to allow rotation of the housing 17 relative to the base plate 12. The base plate 12 is further secured to bumper 13 by two additional bolts 21a and 22a through bores 21 and 22 of base plate 12 and bumper bores 14a and 14c.

A draw or slide bar 23 has at opposite ends bores 25 and 26 with an aperture 24 intermediate of said bores 25 and 26. The slide bar 23 is positioned within housing 17 and retained therein by guide pin 30 secured in bore 26 of slide bar 23 and extending upward in slot 27 of housing 17. Welded to the bottom of the forward portion of the housing 17 is a safety bar 31 having an L-shape which may be an arcuate lip or the like, and a bore hole 32. therein. A circular housing 35 is secured to the safety bar 31 at the bottom about the bore hole 32. A rounded end or nose locking pin or locating pin 36 has a spring plate 37 secured to the locking pin 36 such that when the circular spring plate 37 is fully seated against safety bar 31 the rounded end of pin 36 will extend through the bore hole 32 of the safety bar 31, bore 15 in base plate 12, bore 29 in the bottom wall 17b of housing 17, aperture 24 in slide bar 23 and through semicircular end 27a of slot 27 in the top wall 17a of housing 17 thereby locking swivel hitch 10 in towing position. A spring 39 is captured between spring plate 37 and the bottom plate 38 which has a bore 40 slightly in excess of the diameter of pin 36. The spring 39 biases locking pin 36 in the aforesaid aperture, bores and semicircular end. When fully positioned in the aperture, bores, and semicircular slot, locking pin 36 extends below the bore 40 in bottom plate 38 of the circular housing 35. The locking pin 36 has a ring 41 secured therethrough below bore 40 adapted for pulling the locking pin 36 against the bias of spring 39 sufficient to move the pin out of the semicircular end 27a of slot 27 and out of the aperture 24 in the slide bar 23, and the bores in housing 17, base plate 12 and the safety bar 31. With locking pin 36 withdrawn, housing 17 may then be moved laterally about base plate 12 with the safety bar 1 and circular housing 35 traveling along the semicircular perimeter 11 of the base plate 12 such that throughout its path upward thrust on the housing would be stopped by the engagement of safety bar 31 with the bottom of base plate 12 and downward thrust on the housing 17 would be stopped by the engagement with base plate 12. Thus, there is a nominal amount of tolerance between the base plate 12 and safety bar 31 to permit limited relative vertical movement, but not sufficient movement to damage the housing 17 and cause it to become inoperable. A trailer ball 50 is secured in the bore 25 of slide bar 23 with a washer 51 and a nut 52. Likewise, with locking pin 36 withdrawn, slide bar 23 with trailer ball 50 may be extended from or retracted into housing 17.

The longitudinal travel of slide bar 23 may be increased by moving the "L" shaped safety bar 31 further out on housing 17 and extending coaxially aligned semicircular end 27a of slot 27 further out on housing 17. Also, housing 17 and base plate 12 could be extended with the radius of semicircular perimeter 11 being increased and the radius of the arcuate path of housing 17 described by locking pin 36 being increased.

In a different configuration the bore 20 in base plate 12 could be moved forward so that the housing 24 could be easily rotated approximately 90° in either direction from its forward position.

In operation of the swivel hitch 10, the towing vehicle with the swivel hitch 10 mounted thereon would be backed toward the trailer to be towed until the ball 50 of swivel hitch 10 was within maneuverable range of the mating coupler of the trailer. The ball 50 would then be maneuvered laterally and longitudinally until the hookup was completed. The pulling vehicle would then be driven forward to align the housing 17 and the slide bar 23 longitudinally and then slowed or stopped causing the slide bar to retract into housing 17 with apertures 24 and bores 29, 15 and 32 becoming aligned such that spring 39 will automatically bias latch pin 36 into and through each such aperture and bores and through semicircular end 27a of slot 27 in the top wall of housing 17.

It will be appreciated that various modifications and changes will be suggested from the description and disclosure of the preferred embodiment, and such changes and modifications are within the spirit and scope of the present invention which is limited only by the accompanying claims:

What is claimed is:

1. An improved trailer hitch for mounting on a bumper of a pulling vehicle which includes a swivel and an extendable draw bar assembly comprising:
    an open-ended tubular housing having a top wall, a spaced apart bottom wall, and a pair of spaced apart and opposing side walls,
    the tubular housing having a first bore at one end located in the top wall and a second bore located in the bottom wall, said first bore and said second bore being coaxially aligned respective to each other,
    an aperture in said bottom wall intermediate said second bore and the other end of said bottom wall, and a rectangular slot in said top wall between said first bore and the other end of said top wall, the distal end of the rectangular slot from the first bore is coaxially aligned with respect to said aperture in said bottom wall,
    a base plate having a partial semicircular periphery and at least one mounting hole corresponding to a mounting hole in a vehicular bumper,
    said base plate having a central aperture near the periphery thereof,
    the tubular housing and base plate secured to the bumper forming a trunnion for relative rotation of said tubular housing along the partial semicircular periphery of the base plate,
    said safety member secured to the bottom wall of said tubular housing and extending beneath said semicircular periphery of the base plate,
    said safety member having an aperture therein in alignment with said aperture in the bottom wall of said tubular housing,
    a slide bar having a guide pin at one end and a trailer ball at the other end, said slide bar retained partly within said tubular housing with said guide pin protruding into the rectangular slot in said tubular housing thereby facilitating relative movement between said slide bar and said tubular housing, said slide bar having an aperture therein intermediate said pin and said trailer ball, and a retractable pin biased in engagement with and through the apertures in said safety member, base plate and slide bar for releasably locking said trailer hitch in a trailer towing position.

2. A trailer hitch for attachment to a rear member of a pulling vehicle which swivels and extends and retracts for coupling with a trailer to be towed comprising:

a base plate having a portion which has a semicircular periphery, and having a central mounting hole therein, said central mounting hole defining the center of radius for the semicircular periphery of said base plate, said base plate having an aperture distal from said central mounting hole on the radius bisecting said semicircular periphery, a tubular housing having an upper wall and a lower wall, and having a mounting bore therethrough at one end, a guide slot in the upper wall thereof and an aperture in the lower wall thereof spaced from said mounting bore, a safety member attached beneath said tubular housing with a bore therethrough aligned with said aperture in the tubular housing, a draw bar having one end extending into said tubular housing with a guide member protruding into said guide slot, and having the other end of said draw bar projecting from said tubular housing carrying a trailer coupler, whereby said draw bar may be extended from and retracted into said tubular housing, said draw bar including an aperture intermediate said guide member and said trailer coupler, said base plate and said tubular housing secured to the rear member of the pulling vehicle by a trunnion in said mounting hole and said mounting bore with said tubular housing and safety member extending about the semicircular periphery of the base plate to minimizing relative vertical movement between the tubular housing and the base plate, a locking member having a locking pin biased in engagement with and through the bore in the safety member, the aperture in the base plate, the aperture in the tubular housing and the aperture in the draw bar, and into engagement against the guide slot in the upper wall which upon retraction of the locking pin, the tubular housing is free for arcuate movement about the semicircular periphery and the draw bar is free for extension and retraction from and into said tubular housing.

3. A trailer hitch for attachment to a rear member of a pulling vehicle which swivels and extends and retracts for coupling with a trailer to be towed comprising:

a base plate having a semicircular section, a mounting hole in said base plate being the center of radius for the semicircular periphery of said semicircular section, and having an aperture intermediate the mounting hole and the semicircular periphery on the radius bisecting said semicircular periphery, a tubular housing having an upper wall and a lower wall, and having a mounting bore therethrough at one end, a guide slot in the upper wall thereof and a aperture in the lower wall thereof spaced from said mounting bore, a trunnion extending through said mounting hole and said mounting bore and secured to the rear member of the pulling vehicle which facilitates arcuate movement of said tubular housing along the semicircular periphery, a telescoping draw bar with a guide member retained within said tubular housing by the guide member extending into said guide slot, said draw bar having an aperture therein for alignment with said aperture in the lower wall of said tubular housing, a releasable locking pin assembly for latching said tubular housing aligned and said draw bar retracted therein along the radius bisecting the semicircular periphery of said semicircular section.

4. The trailer hitch of claim 3 wherein said releasable locking pin assembly includes a safety member attached beneath said tubular housing with a bore therethrough aligned with said aperture in the lower wall of said tubular housing, said safety member limiting vertical relative movement between said base plate and said tubular housing.

* * * * *